United States Patent
Taira et al.

(10) Patent No.: US 10,429,818 B2
(45) Date of Patent: Oct. 1, 2019

(54) NUMERICAL CONTROL DEVICE

(71) Applicant: FANUC Corporation, Minamitsuru-gun, Yamanashi (JP)

(72) Inventors: Ryousuke Taira, Minamitsuru-gun (JP); Kouichi Noda, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 238 days.

(21) Appl. No.: 14/833,295

(22) Filed: Aug. 24, 2015

(65) Prior Publication Data
US 2016/0062337 A1    Mar. 3, 2016

(30) Foreign Application Priority Data

Aug. 26, 2014 (JP) ................. 2014-171854

(51) Int. Cl.
*G05B 19/4093* (2006.01)

(52) U.S. Cl.
CPC ......... *G05B 19/40937* (2013.01); *G05B 2219/36088* (2013.01); *Y02P 90/265* (2015.11)

(58) Field of Classification Search
CPC .... G05B 19/40937; G05B 2219/36088; Y02P 90/265
See application file for complete search history.

(56) References Cited

U.S. PATENT DOCUMENTS

| | | | | |
|---|---|---|---|---|
| 2003/0023341 | A1* | 1/2003 | Sagawa ............. | G05B 19/4093 700/159 |
| 2006/0022624 | A1* | 2/2006 | Ushiyama ............ | H02P 3/02 318/275 |
| 2007/0091094 | A1* | 4/2007 | Hong ................... | G05B 19/41 345/474 |
| 2008/0051930 | A1* | 2/2008 | Oh .................. | H01L 21/67276 700/214 |

(Continued)

FOREIGN PATENT DOCUMENTS

| JP | 2002-359500 A | 12/2002 |
|---|---|---|
| JP | 2010-092405 A | 4/2010 |

(Continued)

OTHER PUBLICATIONS

Decision to Grant a Patent issued Oct. 4, 2016 in Japanese Patent Application No. 2014-171854 (3 pages) with an English Translation (3 pages).

*Primary Examiner* — Brian W Wathen
*Assistant Examiner* — Brian T McMenemy
(74) *Attorney, Agent, or Firm* — Drinker Biddle & Reath LLP

(57) ABSTRACT

A numerical control device includes an operating condition acquisition unit, an executing part acquisition unit, a stopping factor acquisition unit, an acquired information storing unit, a reduction information storing unit, a stopping factor reduction information acquisition unit configured to acquire a reduction information of a stopping time corresponding to a stopping factor information from the reduction information (Continued)

storing unit, and a display unit configured to display the executing part and the stopping factor information and the reduction information of the stopping time corresponding to the stopping factor information.

12 Claims, 4 Drawing Sheets

(56) References Cited

U.S. PATENT DOCUMENTS

| | | | | |
|---|---|---|---|---|
| 2013/0123968 A1* | 5/2013 | Nishibashi | ............ | G05B 19/416 |
| | | | | 700/117 |
| 2014/0236340 A1* | 8/2014 | Terada | ................. | G05B 19/182 |
| | | | | 700/160 |
| 2014/0304715 A1* | 10/2014 | Park | ....................... | G06F 9/542 |
| | | | | 719/318 |
| 2015/0066434 A1 | 3/2015 | Ogawa | | |
| 2016/0091886 A1* | 3/2016 | Sato | ..................... | G05B 19/416 |
| | | | | 700/188 |

FOREIGN PATENT DOCUMENTS

| | | |
|---|---|---|
| JP | 2011-039708 A | 2/2011 |
| JP | 2015-052846 A | 3/2015 |
| WO | WO-2014167636 A1 * 10/2014 | ......... G05B 19/4063 |

* cited by examiner

FIG. 2

| STOPPING POSITION | STOPPING FACTOR | REDUCTION INFORMATION OF STOPPING TIME |
|---|---|---|
| EMPTY BLOCK | — | <1> CHANGE MACHINING PROGRAM    DELETE EMPTY BLOCK<br><2> CHANGE PARAMETER SETTING    No.0000#0 SKIP EXECUTION OF EMPTY BLOCK |
| AUXILIARY FUNCTION BLOCK | EXECUTING AUXILIARY FUNCTION | <1> CHANGE PARAMETER SETTING    No.0100#1:EXECUTE AUXILIARY FUCNTION OR NOT    No.0110:DELAY TIME OF RESPONSE FOR AUXILIARY FUNCTION    No.0111:ACCEPTION WIDTH OF COMPLETION SIGNAL OF AUXILIARY FUCTION |
| RAPID TRAVERSE BLOCK | PERFORMING IN-POSITION CHECK | <1> PARAMETER SETTING CHANGE    No.0000#1:OVERLAP OF RAPID TRAVERSE BLOCK IS EFFECTIVE OF NOT EFFECTIVE    No.0001:RATIO OF SPEED REDUCTION OF RAPID TRAVERSE SPEED IN OVERLAP    No.0200:IN-POSITION CHECK WIDTH(RAPID TRAVERSE) |
| CUTTING FEED BLOCK | PERFORMING IN-POSITION CHECK | <1> PARAMETER SETTING CHANGE    No.0300:IN-POSITION WIDTH (CUTTING FEED) |
| CUTTING FEED BLOCK | WAITING FOR SIGNAL INDICATING SPINDLE SPEED REACHES PRESET VALUE | <1> PARAMETER SETTING CHANGE    No.0400#0:CHECK SIGNAL INDICATING SPINDLE SPPED REACHES PRESET VALUE OR NOT CHECK    No.0401:CHECKING TIME OF SIGNAL INDICATING SPINDLE SPPED REACHES PRESET VALUE |
| DWELL BLOCK | PERFORMING DWELLIING | <1> CHANGE OF MACHINING PROGRAM    REDUCTION OF SPECIFIED TIME OF DWELLING |

NUMERICAL CONTROL DEVICE

RELATED APPLICATION DATA

This application claims priority under 35 U.S.C. § 119 and/or § 365 to Japanese Application No. 2014-171854 filed Aug. 26, 2014, the entire contents is incorporated herein by reference.

BACKGROUND OF THE INVENTION

1. Field of the Invention

The present invention relates to a numerical control device, and more particularly to a numerical control device for presenting information for shortening a stopping time of a drive shaft in a machining process based on a machining program.

2. Description of the Related Art

In machining of a workpiece using a machining tool, a shorter cycle time of a series of a machining process is required to improve productivity. The cycle time mainly consists of operating time in which a drive shaft of a machining tool is operated and stop time in which all drive shafts are stopped. It is important for a shorter cycle time, to first consider shortening of a stopping time in which all drive shafts are stopped, since shortened operating time in which a drive shaft of a machining tool is operated sometimes causes deterioration in machining accuracy.

As a conventional art for supporting analysis of machining process, Japanese Patent Laid-Open No. 2011-039708 discloses a technique in which, a reference value and dispersion of the cycle time are obtained from sampling signals of a plurality of times of machining, a threshold value corresponding to variation of sampling data is set by use of a value of the dispersion, failure occurrence is automatically detected using the reference value and the threshold value while relationship between sampling data and block number of machining program is displayed to be grasped. Japanese Patent Laid-Open No. 2010-092405 discloses a numerical control device which associates a time chart of a machining load acquired from time-series data of the machining load with a machining program and displays them on the same screen.

The techniques disclosed in the conventional arts are useful to some extent for detecting and analyzing a failure condition generated during a machining. However, the techniques are not useful for analyzing reduction of stopping time since it is impossible to detect stopping time of a drive shaft without occurrence of failure, such as waiting time for spindle speed to reach a preset value, in-position check in which it is determined shaft position is within a preset range.

It is necessary for improvement of stopping state of a drive shaft, to specify a stopping point of a drive shaft of a machining tool and a stopping factor and examine information of parameter setting, change of program or the like for reducing stopping time based on the stopping factor. However, there is a problem that the examination takes long time or information to reduce the stopping time is not found even when the examination is executed.

SUMMARY OF THE INVENTION

Therefore, the object of the invention is to provide a numerical control device capable of specifying a stopping point of a drive shaft of a machining tool and a stopping factor, and presenting information to an operator for shortening stopping time corresponding to a stopping factor.

A numerical control device according to the present invention is a numerical control device for control a drive shaft of a machining tool based on a machining program, the numerical control device, including an operating condition acquisition unit configured to acquire an operating condition data representing operating condition of the shaft, an executing part acquisition unit configured to acquire an executing part of the machining program, an stopping factor acquisition unit configured to acquire a stopping factor information representing an information concerning a stopping factor at a time when the drive shaft stops, an acquired information storing unit configured to store the operating condition data, the executing part, and the stopping factor, with each being related to an acquisition time thereof, a reduction information storing unit configured to store a reduction information of the stopping time corresponding to the stopping factor information, a stopping factor reduction information acquisition unit configured to acquire the reduction information of the stopping time corresponding to the stopping factor information from the reduction information storing unit, based on the stopping factor information stored in the acquired information storing unit, and a display unit configured to display the executing part and the stopping factor information stored in the acquired information storing unit and the reduction information of the stopping time corresponding to the stopping factor information acquired by the stopping factor reduction information acquisition unit.

The numerical control device may further include a stopping time calculation unit configured to calculate a stopping time for the each stopping factor. The stopping factor acquisition unit may acquire the stopping time corresponding to the stopping factor information when the stopping time calculated by the stopping time calculation unit is longer than a predetermined threshold value.

The reduction information of the stopping time may include a parameter setting information to reduce the stopping time, and the executing part and the stopping factor information stored in the acquired information storing unit and the reduction information of the stopping time corresponding to the stopping factor information acquired by the stopping factor reduction information acquisition unit may be displayed when a parameter setting to be set in the parameter setting information is not set.

The present invention with above described configuration enables an operator to reduce stopping time using reduction information such parameter setting or change of program contents for reducing stopping time, displayed on a screen of the numerical control device, leading to decreased work to examine reduction information and easy reduction of cycle time.

BRIEF DESCRIPTION OF THE DRAWINGS

The above-described object, the other object, and the feature of the invention will be proved from the description of embodiments below with reference to the accompanying drawings. In these drawings:

FIG. 2 is a view showing an example of reduction information of stopping time corresponding to a stopping factor in an embodiment of the present invention.

DETAILED DESCRIPTION OF THE PREFERRED EMBODIMENTS

Figure 1:
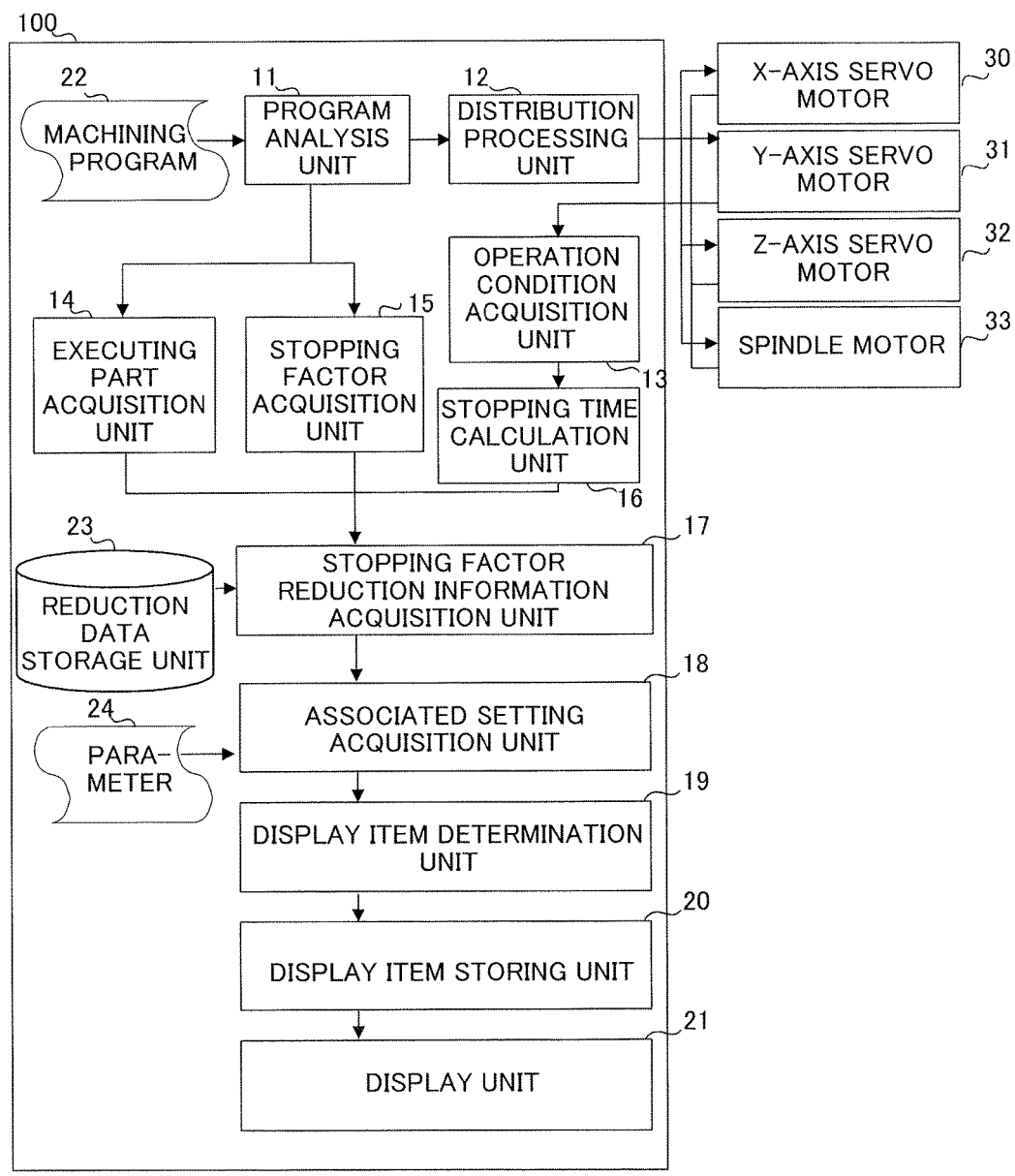
FIG. 1 is a block diagram of a numerical control device in an embodiment of the present invention.

FIG. 1 is a block diagram of a numerical control device (CNC) executing a display of information to reduce cycle time, in an embodiment of the present invention. Numerical control device 100 includes a program analysis unit 11, a distribution processing execution unit 12, an operation condition acquisition unit 13, an executing part acquisition unit 14, a stopping factor acquisition unit 15, a stopping time calculation unit 16, a stopping factor reduction information acquisition unit 17, an associated setting acquisition unit 18, a display item determination unit 19, a display item storing unit 20, and a display unit 21.

The program analysis unit 11 reads and analyzes a machining program 22 stored in a storage device, not shown in the figure, and generates and outputs data used in the distribution processing execution unit 12. The distribution processing execution unit 12 generates and outputs an output pulse to each servo motor of x-axis servo motor, y-axis servo motor, and z-axis servo motor (30, 31, 32) and a spindle motor 33, based on position data output of each shaft output by the program analysis unit 11.

The operation condition acquisition unit 13 acquires operation condition data such as command data and detection data of positions, speeds, and torques of the drive shafts of the servo motors (30, 31, 32) and the spindle motor 33, at a preset sampling period, and sequentially stores the operation condition data with the acquisition time in an storage device, not shown in the figure.

The executing part acquisition unit 14 acquires an executing part of the machining program at a preset sampling period and sequentially store the executing part with the acquisition time in a storage device not shown in the figure. Data of an executing part includes a specification of the executing part of the machining program 22, and includes a block number, a program number, G-code and M-code for example.

The stopping factor acquisition unit 15 generates stopping factor data of a drive shaft, based on information of a currently-executing command such as in in-position check or in executing auxiliary function, analyzed in the program analysis unit 11. Then the stopping factor acquisition unit 15 sequentially stores the stopping factor of the drive shaft with the acquisition data in a storage device not shown in the figure. The stopping factor of the drive shaft includes, (i) waiting time for speed of the spindle of the machining tool to reach a preset value, (ii) waiting time to confirm that positioning of the drive shaft corresponding to a positioning data is completed, (iii) waiting time to confirm that auxiliary process to be executed according to M-code is completed, and the like. The stopping factor data is generated based on a part of the machining program 22 currently under execution by the program analysis unit 11.

The stopping time calculation unit 16 calculates stopping time for each stopping factor based on the operation condition data obtained from the operation condition acquisition unit 13 and the stopping factor obtained from the stopping factor acquisition unit 15, and sequentially stores these data with the acquisition time by the operation condition acquisition unit 13 in a storage device not shown in the figure.

The stopping factor reduction information acquisition unit 17 searches data in a reduction data storage unit 23 based on data stored in the storage device not shown in the figure obtained from the executing part acquisition unit 14, the stopping factor acquisition unit 15, and the stopping time calculation unit 16, to acquire reduction information of stopping time such an parameter setting for reducing stopping time corresponding to a stopping factor or change of program contents. Here, the stopping factor reduction information acquisition unit 17 may be configured to determine whether the stopping time calculated based on the operation condition data at the same time of the execution part and the stopping factor will be effective for reducing the cycle time, and not to read out the reduction information of the stopping time corresponding to the stopping factor, which corresponds to the operation condition data. In the determination, a threshold value for time duration which will be effective for reducing the cycle time may be set in a determination program and the calculated stopping time and the threshold value may be compared with each other. Alternatively, a threshold value for time duration which will be effective for reducing the cycle time may be preliminarily set in preset region of SRAM or the like, not shown in the figure, of the numerical control device 100, and the calculated stopping time and the threshold value may be compared with each other.

FIG. 2 is a view showing an example of the reduction information of the stopping time stored in the reduction data storage unit 23. As shown in FIG. 2, the reduction information of the stopping time is conserved in associated with the stopping point, the stopping factor and the like. In an example shown in FIG. 2, when the stopping factor is determined to be that the process is in an in-position check while the executing part is in a cutting feed block of the machining program, the stopping factor reduction information acquisition unit 17 acquires a reduction information of "<1> Change parameter setting, No. 0300: In-position width (Cutting feed)".

These kinds of parameter settings or program changes for reducing the stopping time corresponding to the each stopping factor may be registered in the reduction data storage unit 23 by an engineer of the manufacturer or an experienced operator.

The associated setting acquisition unit 18 acquires a present set value of a parameter 24 to be reduced in parameter setting in the reduction information corresponding to the stopping factor acquired in the stopping factor reduction information acquisition unit 17. The parameter 24 may be set in preset region of SRAM memory, not shown in the figure, of the numerical control device 100. Alternatively, the parameter 24 may be designated in the machining program 22.

The display item determination unit 19 determines whether setting value of the parameter 24 acquired by the associated setting acquisition unit 18 is configured to be shortenable or not. Whether the setting value of the parameter 24 is configured to be shortenable or not is determined based on whether parameter setting specified in the reduction information is executed or not, whether parameter as an object of setting change to be specified in the reduction information has a value capable of shortening the stopping time or not, and the like.

The display item storing unit 20 stores the stopping point, the stopping factor, and the reduction information, satisfying the determination of the display item determination unit 19, in a storage device such as RAM not shown in the figure.

Then, the display unit 21 displays the stopping point, the stopping factor, and the reduction information stored in the display item storing unit 20, on a screen.

Figure 3:
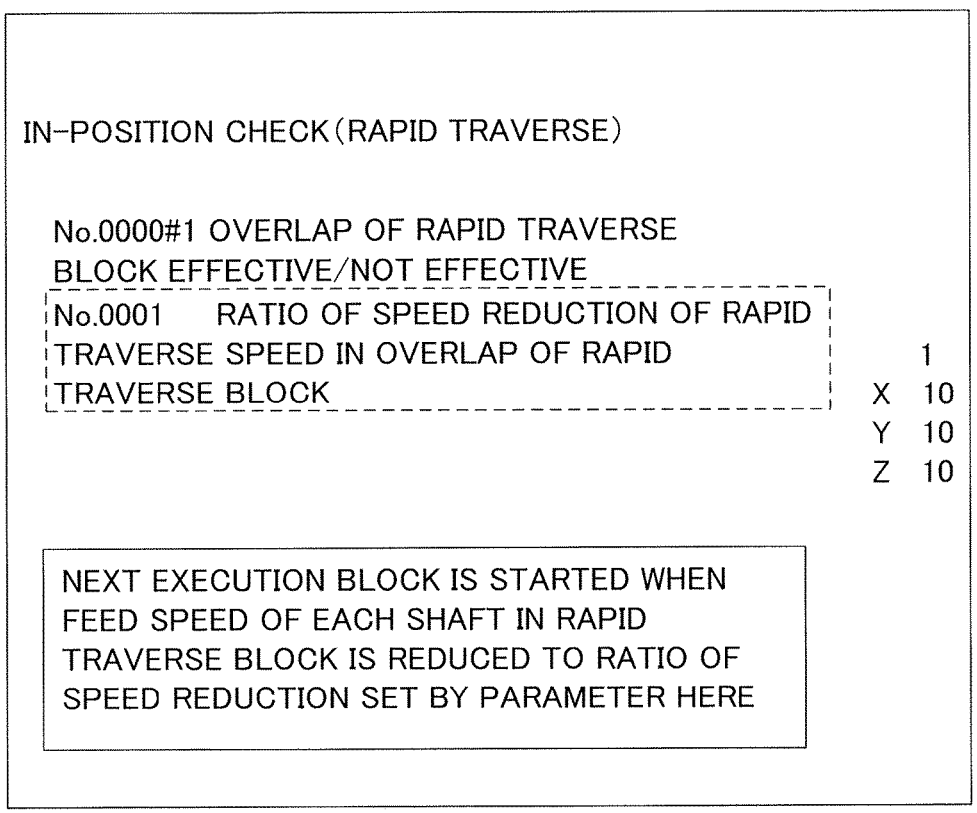
FIG. 3 is a view showing another example of reduction information of stopping time corresponding to a stopping factor in an embodiment of the present invention.

FIG. 3 is a view showing another example of the stopping point, the stopping factor, and the reduction information to be displayed on a screen of the numerical control device 100 in an embodiment of the present invention. An operator can grasp how to reduce the stopping time using the reduction information displayed on the screen, such that the operator can effectively reduce the cycle time.

Figure 4:
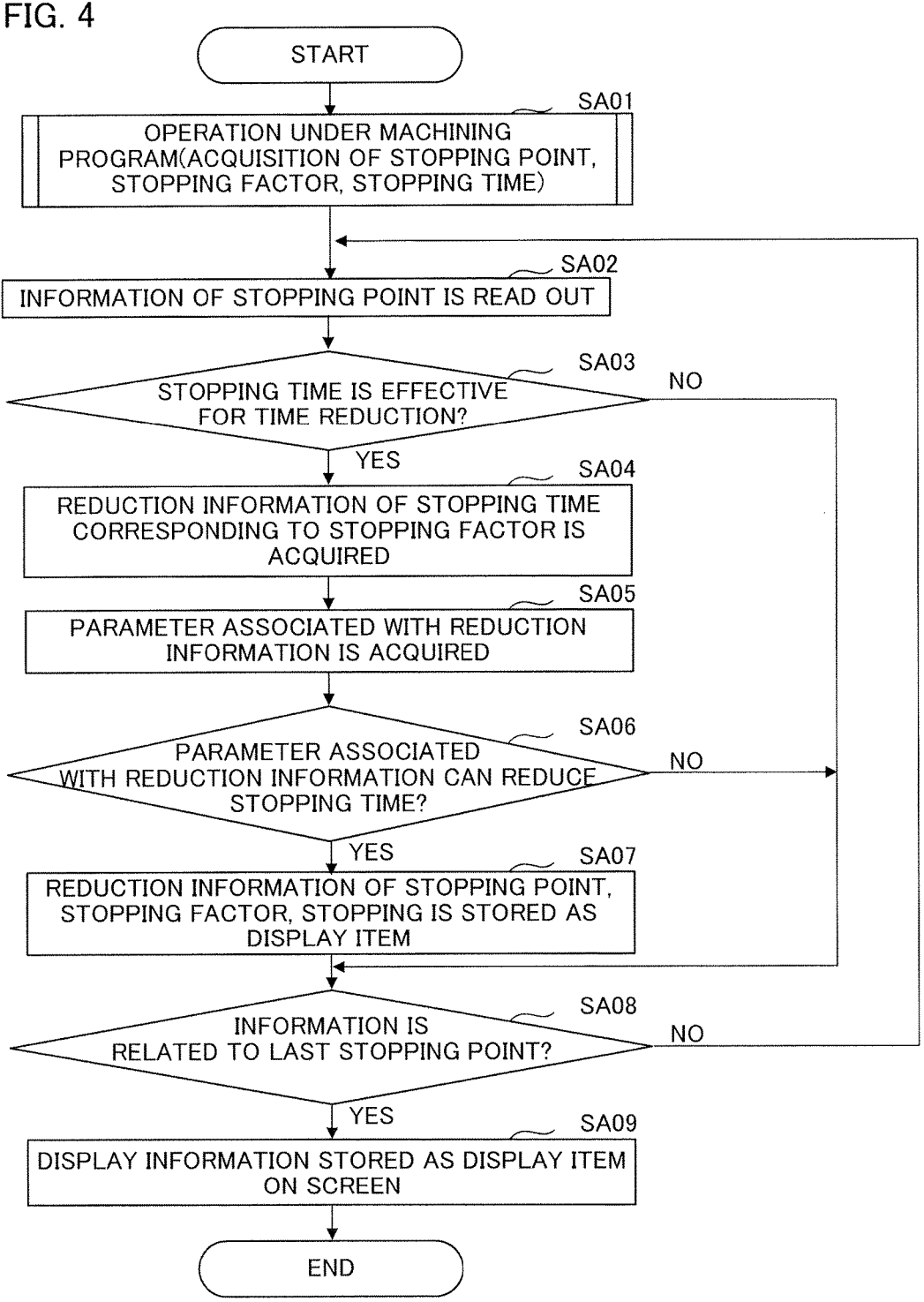
FIG. 4 is a flowchart showing a process of displaying reduction information in an embodiment of the present invention.

FIG. 4 is a flowchart showing a process of displaying the reduction information of the stopping time corresponding to the stopping factor in an embodiment of the present invention.

[STEP SA01] Machining of a workpiece is performed based on the machining program. Information of the stopping point, the stopping factor, and the stopping time are acquired by the executing part acquisition unit 14, the stopping factor acquisition unit 15, the operation condition acquisition unit 13, and the stopping time calculation unit 16 and stored in a storage device not shown in the figure, in the machining step.

[Step SA02] The information of the stopping point, the stopping factor, and the stopping time stored in the storage device in Step SA01 are sequentially read out.

[Step SA03] It is determined whether the stopping time in the information read out in Step SA02 has time duration long enough to be determined to be effective for time reduction, by comparing the time duration with a preset threshold value. When the stopping time is longer than the threshold value, the process proceeds to step SA04, and when the stopping time is not longer than the threshold value, the process proceeds to Step SA08.

[Step SA04] The reduction information of the stopping time corresponding to the stopping factor, read out in Step SA02 is obtained from the reduction data storage unit 23.

[Step SA05] Parameter setting values associated with the reduction information of the stopping time corresponding to the stopping factor acquired in Step SA04 are read out.

[Step SA06] It is determined for the parameter read out in Step SA05, whether the parameter as an object of setting to be specified in the reduction information acquired in Step SA04 is set or not, or, whether the parameter as an object of setting change to be specified in the reduction information has a value capable of shortening the stopping time or not. The process proceeds to Step SA07 when the parameter associated with the reduction information reduces the stopping time, and the process proceeds to Step 08 when the parameter associated with the reduction information does not reduce the stopping time.

[Step SA07] The stopping point and the stopping factor read out in Step SA02, and the reduction information of the stopping time corresponding to the stopping factor read out in Step SA04 are stored in the storage device not shown in the figure as display items.

[Step SA08] It is determined whether the information of the stopping point, the stopping factor, and the stopping time read out in Step SA02 are the last one or not. The process proceeds to Step SA09 when the information is the last one, and the process returns to Step SA02 when other information is stored in the storage device.

[Step SA09] The information stored as items to be displayed are displayed on the screen.

The invention claimed is:

1. A numerical control device for controlling a drive shaft of a machining tool based on a machining program, the numerical control device comprising a processor, the processor configured to:
   acquire an operating condition data representing operating condition of the shaft;
   acquire an executing part of the machining program;
   acquire a stopping factor information representing an information concerning a stopping factor at a time when the drive shaft stops;
   store the operating condition data, the executing part, and the stopping factor, with each being related to an acquisition time thereof;
   store a reduction information of the stopping time corresponding to the stopping factor information;
   determine whether the stopping time corresponding to the stopping factor information satisfies a predetermining threshold value;
   responsive to determining that the stopping time corresponding to the stopping factor information satisfies the predetermined threshold value, acquire the reduction information of the stopping time corresponding to the stopping factor information based on the stored stopping factor information; and
   display the stored executing part and the stopping factor information, and the acquired reduction information of the stopping time corresponding to the stopping factor information,
   wherein the predetermined threshold value corresponds to a time duration associated with reducing a cycle time of the machining tool.

2. The numerical control device according to claim 1, the processor configured to:
   calculate a stopping time for each stopping factor; and
   acquired the stopping time corresponding to the stopping factor information when the calculated stopping time calculated is longer than a predetermined threshold value.

3. The numerical control device according to claim 2, wherein
   the reduction information of the stopping time includes a parameter setting information to reduce the stopping time, wherein
   the stored executing part and the stopping factor information, and the acquired reduction information of the stopping time corresponding to the stopping factor information are configured to be displayed when a parameter setting to be set in the parameter setting information is not set.

4. The numerical control device according to claim 1, wherein
   the reduction information of the stopping time includes a parameter setting information to reduce the stopping time, wherein
   the stored executing part and the stopping factor information, and the acquired reduction information of the stopping time corresponding to the stopping factor information are configured to be displayed when a parameter setting to be set in the parameter setting information is not set.

5. A numerical control device for controlling a drive shaft of a machining tool based on a machining program, the numerical control device comprising a processor, the processor configured to:
   acquire an operating condition data representing operating condition of the shaft;
   acquire an executing part of the machining program;
   acquire a stopping factor information representing an information concerning a stopping factor at a time when the drive shaft stops, the stopping factor of the drive shaft including:
   (i) waiting time for speed of the spindle of the machining tool to reach a preset value;

(ii) waiting time to confirm that positioning of the drive shaft corresponding to a positioning data is completed; and
(iii) waiting time to confirm that auxiliary process to be executed according to M-code is completed;
store the operating condition data, the executing part, and the stopping factor, with each being related to an acquisition time thereof;
store a reduction information of the stopping time corresponding to the stopping factor information;
set a threshold value corresponding to a time duration associated with reducing a cycle time of the machining tool;
determine whether the stopping time corresponding to the stopping factor information satisfies the set threshold value;
responsive to determining that the stopping time corresponding to the stopping factor information satisfies the set threshold value, acquire the reduction information of the stopping time corresponding to the stopping factor information based on the stored stopping factor information; and
display the stored executing part and the stopping factor information, and the acquired reduction information of the stopping time corresponding to the stopping factor information.

6. The numerical control device according to claim 5, the processor configured to:
calculate a stopping time for each stopping factor; and
acquire the stopping time corresponding to the stopping factor information when the calculated stopping time is longer than the set threshold value.

7. The numerical control device according to claim 6, wherein
the reduction information of the stopping time includes a parameter setting information to reduce the stopping time, wherein
the stored executing part and the stopping factor information, and the acquired reduction information of the stopping time corresponding to the stopping factor information are configured to be displayed when a parameter setting to he set in the parameter setting information is not set.

8. The numerical control device according to claim 5, wherein
the reduction information of the stopping time includes a parameter setting information to reduce the stopping time, wherein
the stored executing part and the stopping factor information, and the acquired reduction information of the stopping time corresponding to the stopping factor information are configured to be displayed when a parameter setting to he set in the parameter setting information is not set.

9. A numerical control device for controlling a drive shaft of a machining tool based on a machining program, the numerical control device comprising a processor, the processor configured to:
acquire an operating condition data representing operating condition of the shaft;
acquire an executing part of the machining program;
acquire a stopping factor information representing an information concerning a stopping factor at a time when the drive shaft stops, the stopping factor of the drive shaft including:
(i) waiting time for speed of the spindle of the machining tool to reach a preset value;
(ii) waiting time to confirm that positioning of the drive shaft corresponding to a positioning data is completed; and
(iii) waiting time to confirm that auxiliary process to be executed according to (M-code, is completed;
store the operating condition data, the executing part, and the stopping factor, with each being related to an acquisition time thereof;
store a reduction information of the stopping time corresponding to the stopping factor information;
set a threshold value corresponding to a time duration associated with reducing a cycle time of the machining tool;
determine whether the stopping time corresponding to the stopping factor information is longer than the set threshold value;
responsive to determining that the stopping time corresponding to the stopping factor information is longer than the set threshold value, acquire the reduction information of the stopping time corresponding to the stopping factor information, based on the stopping factor information; and
display the executing part and the stopping factor information and the reduction information of the stopping time corresponding to the stopping factor information.

10. The numerical control device according to claim 9, the processor configured to:
calculate a stopping time for each stopping factor; and
acquire the stopping time corresponding to the stopping factor information when the stopping time is longer than a predetermined threshold value.

11. The numerical control device according to claim 9, wherein
the reduction information of the stopping time includes a parameter setting information to reduce the stopping time, wherein
the executing part and the stopping factor information and the reduction information of the stopping time corresponding to the stopping factor information are configured to be displayed when a parameter setting to be set in the parameter setting information is not set.

12. The numerical control device according to claim 10, wherein
the reduction information of the stopping time includes a parameter setting information to reduce the stopping time, wherein
the executing part and the stopping factor information and the reduction information of the stopping time corresponding to the stopping factor information are configured to be displayed when a parameter setting to be set in the parameter setting information is not set.

* * * * *